United States Patent [19]
Thomas

[11] 3,872,737
[45] Mar. 25, 1975

[54] SELECTOR FOR A TRANSMISSION

[75] Inventor: Dalton A. Thomas, Childersburg, Ala.

[73] Assignees: Hazel Beasley Thomas; Woodford R. Thompson, Jr.; Carter, Hugh P.; William K. Murray; J. Reese Murray, all of Birmingham, Ala.; a part interest to each

[22] Filed: Oct. 26, 1973

[21] Appl. No.: 410,020

Related U.S. Application Data

[63] Continuation-in-part of Ser. No. 254,862, May 19, 1972, Pat. No. 3,780,840.

[52] U.S. Cl. .................................................. 74/339
[51] Int. Cl. .............................................. F16g 1/18
[58] Field of Search ............................. 74/339, 325

[56] References Cited
UNITED STATES PATENTS

| | | | |
|---|---|---|---|
| 977,864 | 12/1910 | Hall | 74/339 |
| 1,853,988 | 4/1932 | Murray | 74/339 |
| 2,201,169 | 5/1940 | Griswold | 74/339 |
| 2,620,907 | 12/1952 | Wickberg | 74/339 |
| 3,478,851 | 11/1969 | Smyth et al. | 74/339 |

Primary Examiner—Wesley S. Ratliff, Jr.
Attorney, Agent, or Firm—Jennings, Carter & Thompson

[57] ABSTRACT

A selector for a transmission having power transmitting rotary members, such as gears, operatively connected to each other and mounted for rotation about an axis common with the axis of a shaft-like member. A selector element rotates with the shaft-like member adjacent each rotary member with the selector element and rotary member being adapted for axial movement relative to each other and with means to urge each selector element and the adjacent rotary member away from each other. Cooperating connector elements rotate with each selector element and the adjacent rotary member. Each selector element is shifted toward the adjacent rotary member by an actuator member to engage the cooperating connector elements until the actuator member is shifted and the connector element rotatable with the selector element moves to a position in advance of the connector element rotatable with the rotary member. Depressable means urges one of the cooperating connector elements toward the other so that said one cooperating connector element is depressed upon engagement with the other while the connector element carried by the selector element is rotating at a speed greater than that of the connector element rotatable with the rotary member.

14 Claims, 24 Drawing Figures

SELECTOR FOR A TRANSMISSION

REFERENCE TO RELATED APPLICATION

This is a continuation-in-part of my copending application Ser. No. 254,862, filed May 19, 1972, now U.S. Pat. No. 3,780,840.

BACKGROUND OF THE INVENTION

This invention relates to a selector for a transmission and more particularly to mechanism for shifting the power transmitting rotary members such as gears of the transmission to selected positions without having to decrease the speed of rotation of the gears during the shift operation and includes improved means for down shifting.

Heretofore in the art to which my invention relates, it has been the usual practice to shift gears by disengaging the clutch between the transmission and the motor and then placing the gear selector in a neutral position whereupon there is a reduction in the speed of rotation of the gears being shifted during the shifting operation. This not only necessitates the operation of the clutch each time the gears are changed in the transmission but also decreases the speed of rotation of the gears whereby the gears must start from a reduced speed each time the gears are changed. Also, difficulties have been encountered in shifting the transmission to a lower gear setting.

BRIEF SUMMARY OF THE INVENTION

In accordance with my present invention, I provide a selector mechanism for a transmission having power transmitting rotary members, such as gears operatively connected to each other and mounted for rotation about an axis common with the axis of rotation of a shaft-like member. Adjacent each gear is a selector element which rotates with the shaft-like member. Cooperating connector elements rotate with each selector element and the gear adjacent thereto and are adapted for relative axial movement. The selector element and the connector element rotatable with the adjacent gear are urged axially away from each other. An actuator member imparts relative axial movement between the selector element and the connector element rotating with the adjacent gear to engage the cooperating connector elements with each other until the actuator member is shifted and the connector element rotatable with the selector element moves to a position in advance of the connector element which rotates with the gear. Depressable means urges one of the cooperating connector elements toward the other so that it is depressed upon engagement with the other while the connector element carried by the selector element is rotating at a speed greater than that of the connector element rotating with the gear.

DESCRIPTION OF THE DRAWINGS

Apparatus embodying features of my invention is illustrated in the accompanying drawings, forming a part of this application, in which:

FIG. 5A is a fragmental view corresponding to FIG. 5, partly broken away and in section, showing the position of the depressable connector element as it moves past the connector element carried by the adjacent rotary member with the selector element rotating at a speed greater than the speed of rotation of the adjacent rotary member;

Figures 1, 6, 7, 8, 9, 10:
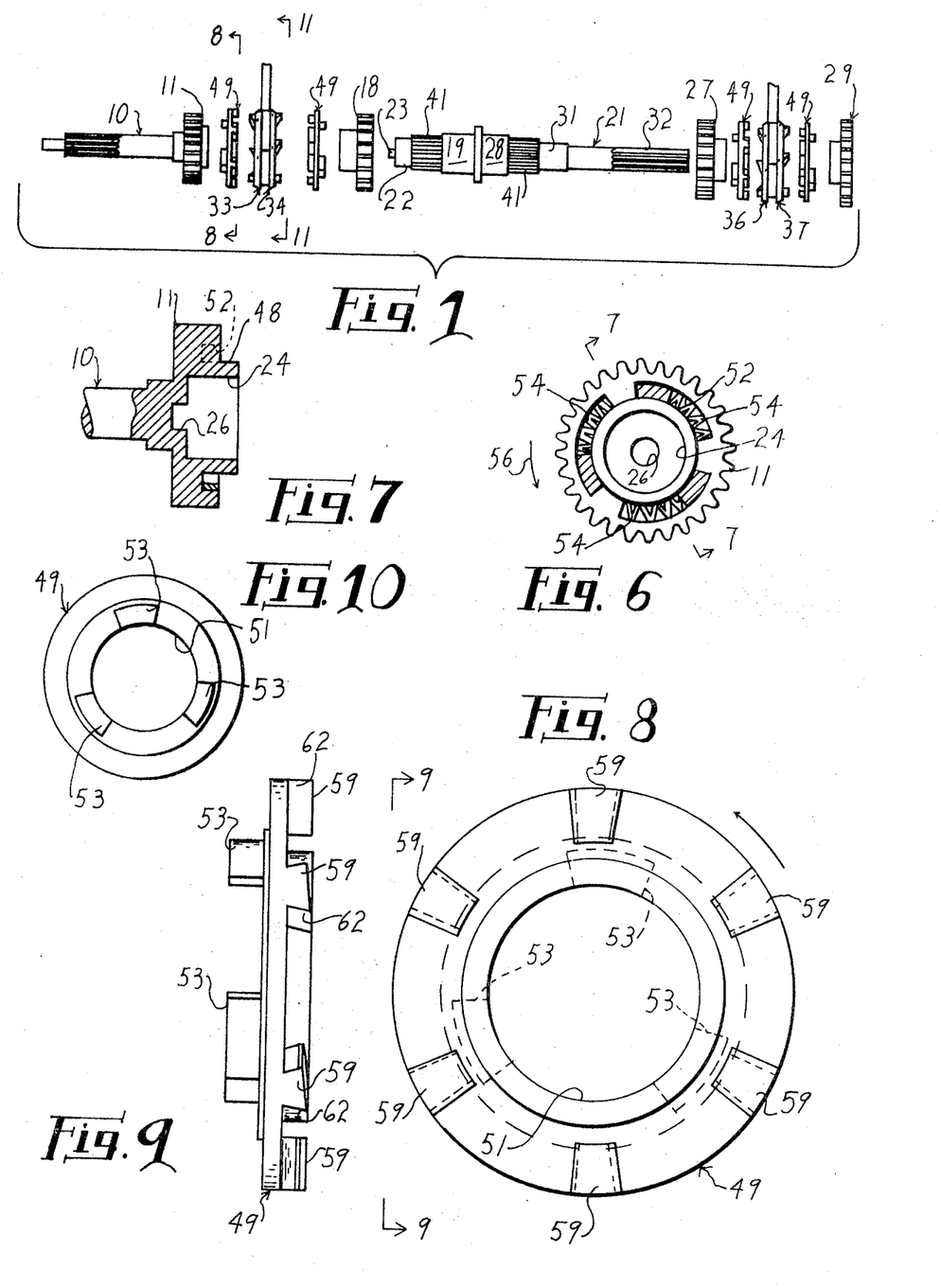
FIG. 1 is an exploded view showing the various components of the mechanism separated from each other.
FIG. 6 is a sectional view taken generally along the line 6—6 of FIG. 2.
FIG. 7 is a fragmental, sectional view taken generally along the line 7—7 of FIG. 6.
FIG. 8 is an enlarged view taken generally along the line 8—8 of FIG. 1.
FIG. 9 is an elevational view taken generally along the line 9—9 of FIG. 8.
FIG. 10 is a side elevational view showing the opposite side of the apparatus shown in FIG. 8, drawn to a smaller scale.
Figures 2, 3, 4, 5:
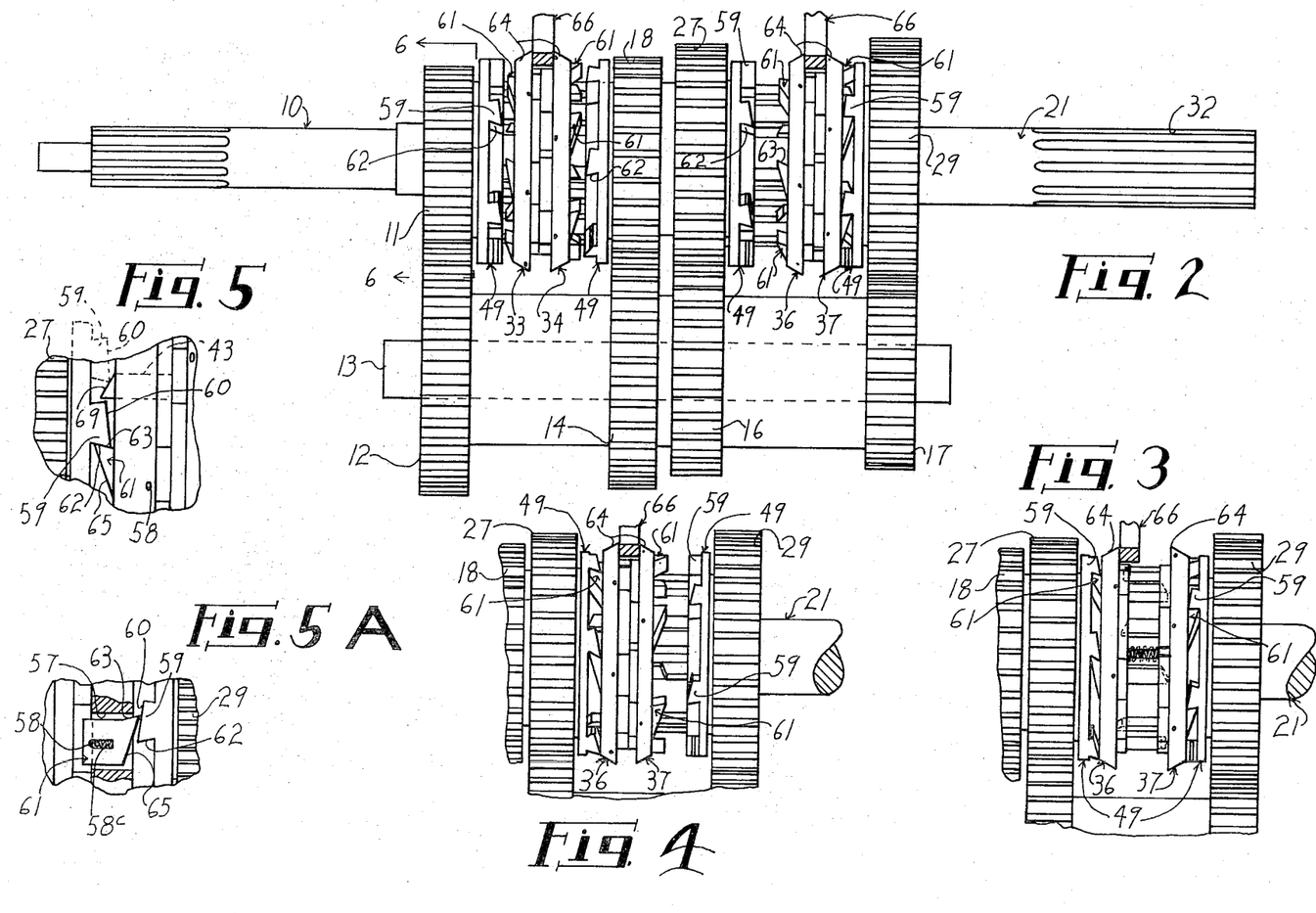
FIG. 2 is a side elevational view corresponding to FIG. 1, drawn to a larger scale, showing the gear mechanism in first gear position and including the idler gear arrangement for operatively connecting the gears to each other, the actuator member for the gear selector mechanism being broken away and in section, for the sake of clarity.
FIG. 3 is a fragmental view of the apparatus shown in FIG. 2 showing the position of the mechanism immediately upon shifting the actuator member for the gear selector to second gear position and prior to release of the first gear.
FIG. 4 is a fragmental view corresponding to FIG. 3 showing the actuator member for the gear selector in second gear position immediately after release of the first gear.
FIG. 5 is an enlarged, fragmental view showing the stop member which limits rearward movement of the connector element which is rotatable with the adjacent gear.

Referring now to the drawings for a better understanding of my invention, I show a conventional main drive shaft 10 which is connected to a conventional clutch, not shown, in the usual manner. The main drive shaft 10 carries power transmitting rotary member, such as a main drive gear 11, which constitutes the fourth speed gear for the transmission. As shown in FIG. 2, the gear 11 is in mesh with a power transmitting rotary member, such as a gear 12, mounted on an idler shaft 13 which in turn is mounted for rotation in the transmission housing in the usual manner. Mounted for rotation with the idler shaft 13 are power transmitting rotary members or gears 14, 16 and 17. The gear 14 is in mesh with power transmitting rotary member in the form of a third speed gear 18 which rotates freely on a smooth surfaced portion 19 of a main shaft 21, as shown in FIG. 1. One end of the shaft 21 is provided with reduced diameter portions 22 and 23 which engage with a rotating fit bearing surfaces 24 and 26, respectively, provided in the adjacent end of the main drive shaft 10, as shown in FIGS. 6 and 7. The gear 16 is in mesh with a power transmitting rotary member in the form of a second speed gear 27 which is adapted to rotate freely on a smooth surface 28 on the shaft 21, as shown in FIG. 1. The gear 17 is in mesh with a power transmitting rotary member in the form of a first speed gear 29 which rotates freely on a smooth surface 31 on the shaft 21, as shown. The output end of the main shaft 21 may be provided with the usual splines 32 for connection to a member to be driven, such as a driven shaft for a vehicle.

While I have shown the teeth on the gears described hereinabove as extending generally parallel to the shafts 10 and 21, it will be apparent that the teeth may be of various configurations well known in the art to which my invention relates. That is, the teeth on the gears would be of the conventional type employed in transmissions. In view of the fact that the gear arrangement described hereinabove is conventional and the power transmitting rotary members may be in forms other than gears, no further description thereof is deemed necessary. Accordingly, the reference to gear is intended to include any suitable form of power transmitting rotary member.

Figures 11, 12, 13, 14:
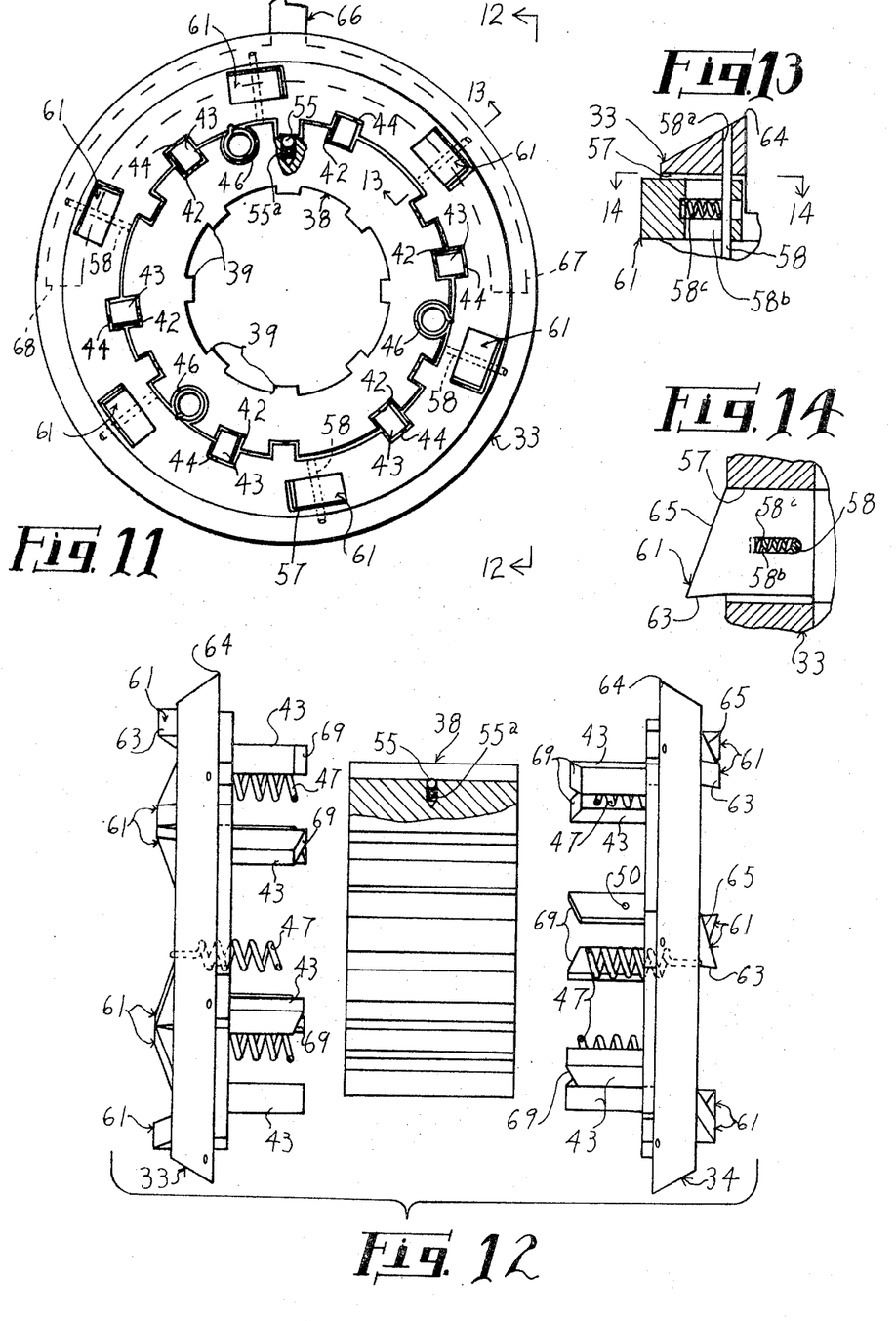
FIG. 11 is an enlarged side elevational view taken generally along the line 11—11 of FIG. 1.
FIG. 12 is an exploded view taken generally along the line 12—12 of FIG. 11, partly broken away and in section, and showing the gear selector elements separated from the shaft-like member.
FIG. 13 is an enlarged sectional view taken generally along the line 13—13 of FIG. 11.
FIG. 14 is a sectional view taken generally along the line 14—14 of FIG. 13.

My improved gear selector mechanism is mounted between adjacent pairs of gears 11-18 and 27-29. As shown in FIGS. 1 and 2, the gears 11, 18, 27 and 29 rotate about an axis which is common with the axis of rotation of the shafts 10 and 21. Mounted nonrotatably on the shaft 21 adjacent a side of each of the gears 11, 18, 27 and 29 are gear selector elements 33, 34, 36 and 37, respectively. Each gear selector element is adapted for axial movement relative to the shaft 21. Preferably, each pair of gear selector elements 33-34 and 36-37 are mounted on a shaft-like member in the form of a sleeve 38 having internal splines or keys 39 which are adapted to cooperate with corresponding splines 41 carried by the shaft 21 whereby the sleeve 38 rotates with the shaft 21. As shown in FIGS. 11 and 12, angularly spaced, axially extending grooves 42 are provided in the outer surface of the sleeve 38 in position to receive elongated, angularly spaced guide members 43 carried by and extending laterally from the selector elements 33, 34, 36 and 37. The elongated members 43 are rectangular, as viewed in cross section whereby they slide freely in the grooves 42 to permit axial movement of the selector elements relative to the sleeve 38 and the shaft 21. Also, the ends of the elongated members 43 serve as stop members to limit relative rearward movement of the gear adjacent thereto in a manner to be described hereinafter. As shown in FIG. 11, the elongated laterally extending guide members 43 are formed integrally with the gear selector elements with the free end of each elongated member 43 of one gear selector element riding in a groove 44 extending axially of the adjacent, oppositely disposed gear selector element. For example, the elongated members 43 carried by the gear selector element 33 ride in grooves 44 provided in the gear selector element 34 while the elongated members 43 carried by the gear selector element 34 ride in grooves 44 provided in the gear selector element 33. Accordingly, the gear selector elements 33 and 34 are adapted for axial movement toward and away from each other while the gear selector elements 36 and 37 are also adapted for axial movement relative to each other.

Longitudinally extending recesses 46 are provided in the outer surface of the sleeve 38 for receiving tension springs 47, as shown. The ends of the springs 47 are connected to the adjacent gear selector elements whereby adjacent gear selector elements are urged toward each other and away from their associated gear. That is, the springs 47 urge the gear selector elements 33 and 34 toward each other whereby the gear selector element 33 is urged away from gear 11 while gear selector element 34 is urged away from gear 18. In like manner, the springs 47 urge the gear selector elements 36 and 37 toward each other with the gear selector element 36 being urged away from gear 27 and gear selector element 37 being urged away from gear 29.

Alternate ones of the elongated members 43 are provided with inwardly facing recesses 50 for receiving ball-like members 55 which are urged toward the recesses 50 by compression springs 55a, as shown in FIGS. 11 and 12. The cooperation of the ball-like members 55 in the recesses 50 aid in retaining the gear selector elements 33, 34, 36 and 37 in a neutral position relative to the sleeve 38. Upon shifting a gear selector element away from neutral position, the ball-like members 55 carried thereby compress the springs 55a associated therewith whereby the ball-like members 55 move out of their recesses 50.

As shown in FIG. 7, an annular shoulder 48 is provided at the side of the gear 11 adjacent the gear selector element 33 for receiving an annular member 49 having a centrally disposed opening 51 therein for receiving the annular shoulder 48. Angularly spaced recesses 52 are provided in the side of the gear 11 in position to receive laterally projecting detents 53 carried by the annular member 49. As shown in FIG. 6, each recess 52 is arcuate in shape and is of a length to receive a suitable compression spring 54 to serve as a shock absorber as the gear 11 is driven in the direction of the arrow 56. Each compression spring 54 may comprise a plurality of separate generally V-shaped components, as shown, or may be formed as an integral member. In view of the fact that various forms of compression springs well known in the art may be employed no further description thereof is deemed necessary. In like manner, an annular member 49 is connected to the gears 18, 27 and 29, there being arcuate recesses 52 in the face of the gears 18, 27, and 29 adjacent the annular member 49 for receiving the laterally projecting detents 53.

Angularly spaced connector elements 59 are carried by the annular members 49 in position to cooperate with connector elements 61 carried by the adjacent gear selector element 33, 34, 36 or 37, as the case may be. As clearly shown in FIG. 9 each connector element 59 is provided with a cam surface 62 which slopes forwardly and away from the gear adjacent thereto as viewed in the direction of rotation of the adjacent gear. In like manner, each connector element 61 carried by the gear selector elements is provided with a cam surface 63 which also slopes forwardly and away from the gear adjacent thereto, as viewed in the direction of rotation of the adjacent gear. Accordingly, the sloping cam surfaces of the connector element 59 and 61 are adapted to move into and out of engagement with each other upon axial movement of the gear selector element toward and away from the gear adjacent thereto with the cooperating surfaces 62 and 63 interlocking with each other upon movement of the connector elements 59 and 61 into engagement with each other.

As shown in FIGS. 13 and 14 each connector element 61 is mounted for sliding movement in an opening 57 in the gear selector element whereby it is adapted to move toward and away from the adjacent connector elements 59. Each connector element 61 is connected to the selector element by a suitable pin 58 which passes through an opening 58a in the selector element and an elongated opening 58b in the connector element 61. A compression spring 58c is mounted within the elongated opening 58b and abuts the pin 58 to urge the connector element 61 toward the adjacent connector element 59. Accordingly each connector element 61 is depressable so that it is depressed upon engagement with the adjacent connector element 59 while the connector element 61 is rotating at a speed greater than that of the connector element 59 which rotates with its associated gear 11, 18, 27 or 29, as the case may be.

As shown in FIGS. 2 through 5A, an outer portion of each connector element 59 and 61 is provided with a cam surface 60 and 65, respectively, which slopes forwardly and away from the adjacent gear, as viewed in the direction of rotation of the gear. Accordingly, upon removal of the elongated stop member 43 from the path of movement of the adjacent connector element 59, the connector element 59 can move in a rearward direction relative to connector element 61. That is, the cooperating surfaces 62 and 63 can rotate in a direction away from each other as the cam surfaces 60 and 65 engage and move relative to each other.

As shown in FIGS. 1 through 4 and 13, each gear selector element 33, 34, 36 and 37 is provided with an outwardly projecting annular flange 64. The annular flange 64 of adjacent gear selector elements 33–34 and 36–37 define an annular recess for receiving an actuator member in the form of a shift fork 66 having legs 67 and 68. The shift fork 66 is of the conventional type employed on transmissions for automobiles and the like. In view of the fact that the mechanism for operating such shift forks is well known in the art, no further description thereof is deemed necessary. The shift fork 66 is adapted to shift each gear selector toward the gear adjacent thereto so that its cooperating connector element 61 moves into engagement with and rotates with the connector element 59 which rotates with the gear adjacent thereto. The interlocked surfaces 62 and 63 of the connector elements 59 and 61 remain in engagement with each other until the shift fork 66 is shifted and the connector element 61 carried by the gear selector element moves to a position in advance of the connector element 59 which rotates with the adjacent gear.

While the gear selector elements are urged to their innermost position relative to each other by the springs 47, the free ends of the elongated members 43 move to a position to engage and limit rearward relative rotary movement of an adjacent connector element 59 which is rotatable with the gear adjacent thereto. As shown in FIG. 5, the trailing edge of each connector element 59 is spaced from the leading edge thereof to provide an interlock between the end of the elongated member 43 and the trailing edge of the connector member 59. The free end of the elongated member 43 thus forms a stop member to limit relative rearward movement of the adjacent connector element 59. Also, as shown in FIG. 5, the elongated member 43 is provided with a sloping cam surface 69 at the free end thereof disposed to be engaged by an adjacent connector element 59 upon forward rotary movement of the adjacent gear, as the connector element 59 moves from the dotted line position to the solid line position, while the elongated member 43 is in the position shown in FIG. 5 to thus move the elongated member 43 out of the path of forward rotary movement of the connector element 59 which rotates with the adjacent gear.

Since the connector element 61 is depressable, as shown in FIG. 5a, it moves inwardly of the opening 57 as the cam surfaces 60 and 65 engage each other while the connector element 61 and its selector element is rotating at a speed greater than that of the adjacent connector element 59 and the gear rotating therewith. Accordingly, the shift fork 66 may be shifted from the higher gear 27 to the lower gear 29 by moving the shift fork 66 toward the lower gear 29. In down shifting to a lower gear setting, the selector element and its connector element 61 would be rotating at a greater speed than the lower gear and its connector element 59 whereby the connector element 61 would be depressed as it passes over the adjacent connector element 59. Immediately after the connector element 61 passes over the adjacent connector element 59, the spring 58c urges the connector element 61 in a direction for its surface 63 to move into engagement with the surface 62 of the connector element 59. At this time the elongated stop member 43 moves into engagement with the opposite side of the connector element 59, due to the force imparted by springs 47, whereby the connector element 59 is locked between the connector element 61 and the stop member 43.

Figure 16:
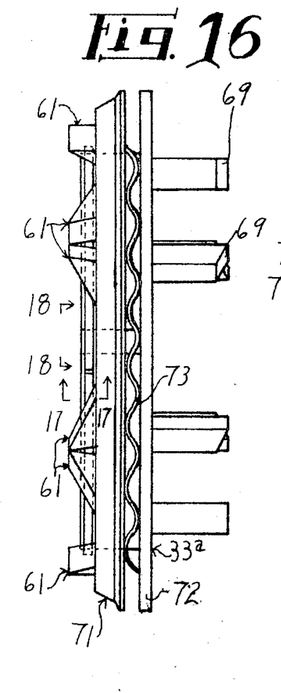
FIG. 16 is a side elevational view showing a modified form of selector element wherein the connector elements are carried by a common member which is urged axially by a spring member.
Figure 17:
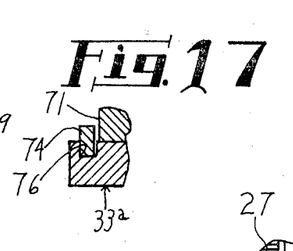
FIG. 17 is a fragmental, sectional view, drawn to a larger scale, taken generally along the line 17—17 of FIG. 16.
Figure 18:
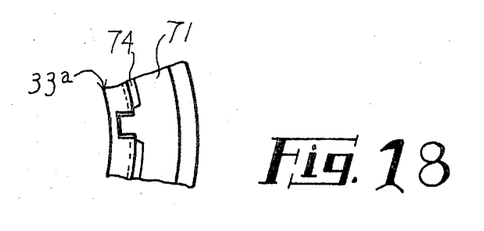
FIG. 18 is a fragmental view taken generally along the line 18—18 of FIG. 16.

In FIG. 16 I show the connector elements 61 as being carried by a common, annular member 71 which telescopes over and is keyed to an annular member 33a, as shown in FIG. 18, to provide a selector element. An annular, outwardly projecting flange 72 is provided on the annular member 33a in spaced relation to the annular member 71 for receiving an annular spring member 73 which is adapted to urge the annular member 71 away from the annular flange 72. Accordingly, all of the connector elements 61 carried by the annular member 71 move inwardly therewith toward the annular flange 72 as the connector elements 61 pass over adjacent connector elements 59. A lock ring 74 engages an annular recess 76 in the member 33a to limit outward movement of the annular member 71 relative to the member 33a.

Figure 5B:
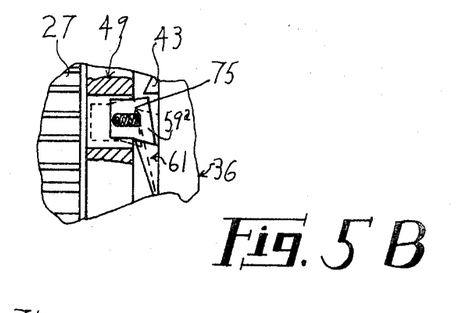
FIG. 5B is a view similar to FIG. 5A showing the depressable connector element as being carried by the rotary member.

In FIG. 5B I show the depressable connector element as being a connector element 59a carried by the annular member 49. That is, the connector element 59a would perform the same function as the connector element 59 and would also be depressable to permit the adjacent connector element 61 to pass relative thereto in the event the connector element 61 is moved into engagement with the connector element 59a while the connector element 61 is rotating at a greater speed than that of the connector element 59a. A compression spring 75, identical to spring 58c, urges the connector element 59a toward the adjacent connector element 61 carried by the adjacent selector element.

Figure 15:
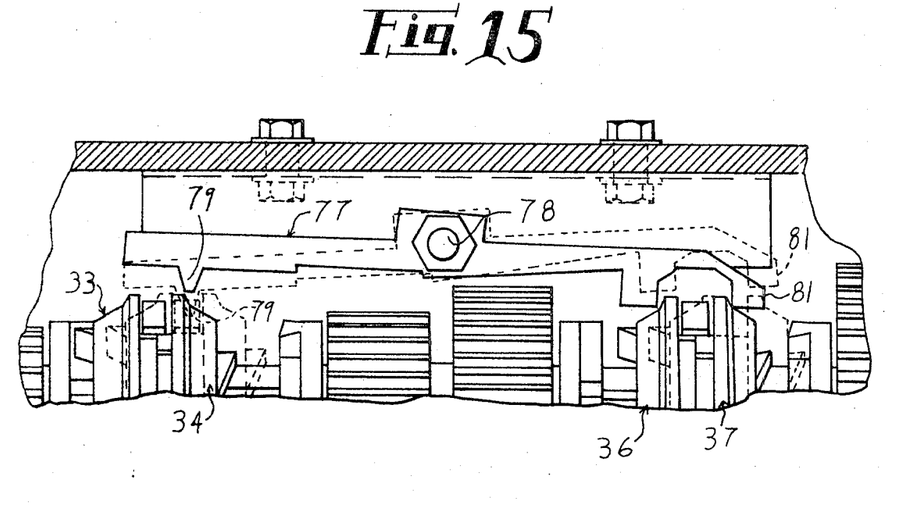
FIG. 15 is an enlarged, fragmental view taken through the transmission housing showing the lock out means which restrains axial movement of one selector unit while the other selector unit is out of a neutral position.

In FIG. 15 I show lock out means which restrains relative axial movement between the selector elements and the connector elements 59 rotatable with one pair of gears while relative axial movement is taking place between the selector elements and the connector elements 59 rotatable with the other pair of gears. An elongated member 77 is pivotally mounted intermediate its ends on a pivot member 78 which is located between the two pairs of selector elements 33–34 and 36–37. Retaining members 79 and 81 are carried by opposite ends of the elongated member 77 in position to move into engagement with and limit axial movement of selector elements 33–34 and 36–37 as the elongated member 77 is pivoted to the dotted line position and the solid line position, respectively. The retaining member 79 is shown as being an inwardly extending projection disposed to move into the recess between selector elements 33 and 34. Since the springs 47 urge the elements 33 and 34 toward each other, the projection 79 restrains axial movement of elements 33 and 34 while it is in the dotted line position. The retaining member 81 is shown as being in the form of a yoke-like member disposed to engage the selector elements 36 and 37, as shown, while in the solid line position. It will thus be seen that upon shifting the selector elements 33 or 34 the projection 79 would be forced to the solid line position, thus moving retaining member 81 into locking engagement with selector elements 36 and 37 whereby they are held in a neutral position. Upon shifting selector elements 36 or 37 the retaining member 81 is forced to the dotted line position, thus moving retaining member 79 into locking engagement with selector elements 33 and 34 whereby they are held in a neutral position.

From the foregoing description, the operation of my improved selector mechanism shown in FIG. 1 through 18 will be readily understood. Before shifting the actuator member 66 to the first gear position, both actuator members 66 are in their neutral positions whereby the connector elements 59 and 61 are all out of engagement with each other. Power is transmitted from drive shaft 10 through the fourth gear 11 to gear 12 which is mounted on idler shaft 13. Power is then transmitted from gears 14, 16 and 17, which rotate with idler shaft 13, to gears 18, 27 and 29, respectively. Since the gears 18, 27 and 29 rotate freely on the smooth surfaces on shaft 21 no power is transmitted to the drive shaft 21 while both shift forks 66 are in the neutral position.

FIG. 2 shows the actuator member 66 for the gear selector elements 36 and 37 shifted toward the right whereby the connector elements 61 of gear selector element 37 move into engagement with the connector elements 59 on the adjacent annular member 49 carried by the first gear 29. Accordingly, power is transmitted from first gear 29 through the connector elements 59 and 61 to the gear selector element 37 which in turn is connected non-rotatably to the sleeve member 38. Since sleeve member 38 is keyed to shaft 21, power is then transmitted to shaft 21 while the actuator member 66 is in the position shown in FIG. 2.

To shift the transmission to the second gear position, the actuator member 66 for the gear selector elements 36–37 is shifted toward the left, as viewed in FIG. 3, whereby the connector elements 61 on the gear selector element 36 move into engagement with the connector elements 59 carried by the annular member 49 connected to the second gear 27. Due to the interlock relationship between the surfaces 62 and 63 of the connector elements 59 and 61, the connector elements 61 of the gear selector element 37 remain in contact with the connector elements 59 as the actuator member 66 is shifted toward the left to second gear position, as shown in FIG. 3. Since second gear 27 is rotating at a faster speed than first gear 29 and due to the fact that second gear 27 is connected in driving relation to the gear selector element 36 which in turn rotates with gear selector element 37, as described above, the connector elements 61 of the gear selector element 37 move or rotate faster than the adjacent connector elements 59. Accordingly, the connector elements 61 carried by the gear selector element 37 move to an angular position in advance of the position of the adjacent connector elements 59 whereby the surfaces 62 and 63 are no longer interlocked. As this occurs, the tension springs 47 urge the selector element 37 away from the first gear 29 to the position shown in FIG. 4.

The transmission remains in the second gear setting until the actuator member 66 for the gear selector elements 36–37 is shifted to neutral position and the actuator member 66 for the gear selector elements 33–34 is shifted toward the right, as viewed in FIG. 2, to move the gear selector element 34 toward the adjacent annular member 49 carried by the third gear 18. The connector elements 61 of the gear selector element 34 thus engage the adjacent connector elements 59 carried by the adjacent annular member 49 whereby power is transmitted from the third gear 18 to the gear selector element 34 and then to the shaft 21. Since the third gear 18 rotates faster than the second gear 27, and is now operatively connected to shaft 21, the gear selector element 36 will rotate at a greater speed than the adjacent annular member 49 whereby the connector element 61 carried by the gear selector element 36 will move in advance of the connector elements 59 carried by the adjacent annular member 49 which rotates with the second gear 27. Upon movement of the connector element 61 of the gear selector element 36 out of engagement with the adjacent connector element 59, the tension springs 47 move the gear selector element 36 from the position shown in FIG. 4 to a neutral position out of engagement with annular member 49.

The connector elements 61 on the gear selector element 34 then remain in contact with the adjacent connector elements 59 carried by the adjacent annular member 49 until the actuator member 66 is shifted toward the left, as viewed in FIG. 2, to the fourth gear setting. In this position, the connector elements 61 on the gear selector element 33 move into engagement with the connector elements 59 carried by the adjacent annular member 49 whereby rotary motion is then transmitted from the fourth gear 11 through gear selector element 33 to the shaft 21. Since the fourth gear 11 is rotating faster than the third gear 18, the connector elements 61 carried by the gear selector element 34 move to a position in advance of the adjacent connector elements 59 carried by the adjacent annular member 49 to thus permit the cooperating surfaces 62 and 63 to move away from each other whereupon the tension springs 47 move the gear selector element 34 toward the left, as viewed in FIG. 2, and out of engagement with the adjacent annular member 49.

The gear selector element 33 remains in the fourth gear position until the actuator member 66 is shifted toward the right as viewed in FIG. 2. Upon reducing power transmitted to the drive shaft 10, the connector elements 61 on the gear selector element 33 tend to move to a position in advance of the connector elements 59 carried by the adjacent annular member 49 whereupon the tension springs 47 move the gear selector element 33 toward the right to the neutral position shown in FIG. 2.

With the gear selector elements 33–34 and 36–37 in their innermost positions relative to each other, the elongated stop members 43 project to the position clearly shown in FIG. 5 whereby the leading surface of the stop member 43 engages the trailing edge of the adjacent connector element 59 to thus limit rearward angular movement of the connector element 59 relative to the connector element 61. Due to the interlocking relationshhip between the trailing edge of the connector element 59 and the adjacent portion of the stop member 43, the connector elements 59 and 61 remain in interlocked relationship to each other until the stop member 43 is moved laterally out of the path of movement of the trailing edge of the connector member 59 adjacent thereto. While the cooperating surfaces 62 and 63 are in engagement with each other, the connector elements 59 and 61 are held against separation. On the other hand, upon movement of the cooperating surfaces 62 and 63 away from each other, as shown in FIG. 5, the trailing edge of the connector element 59 engages the adjacent surface on the stop member 43 to thus prevent separation of the connector elements 59 and 61. However, upon shifting the actuator member 66 to move the adjacent gear selector elements 33–34 or 36–37, as the case may be, away from each other the elongated stop members 43 move out of the path of movement of the connector elements 59 adjacent thereto, whereby upon separation of the adjacent cooperating surfaces 62 and 63 the tension springs 47 move the gear selector element thus released and its connector elements 61 out of the path of rotation of the connector element 59 adjacent thereto.

In down shifting from a higher gear to a lower gear the selector element and its connector element 61 would be rotating at a higher speed than the lower gear and its connector elements 59 due to the fact that the selector elements rotate with the output shaft 21 which is rotating at the higher speed. As the surface 65 of the connector element 61 moves past the adjacent connector element 59 the connector element 61 is depressed, as shown in FIG. 5A. After passing the connector element 59, the connector element 61 is urged by spring 58c into engagement with the adjacent connector element 59 whereby the surfaces 62 and 63 interlock with each other to thus connect the selector element to the adjacent annular member 49. With the embodiment shown in FIG. 5B, the connector element 59a carried by the member 49 would be depressed as the connector element 61 passes the connector element 59a. In the embodiment shown in FIGS. 17–18 the spring 73 would urge the connector elements 61 toward the elements 59.

Figure 19:
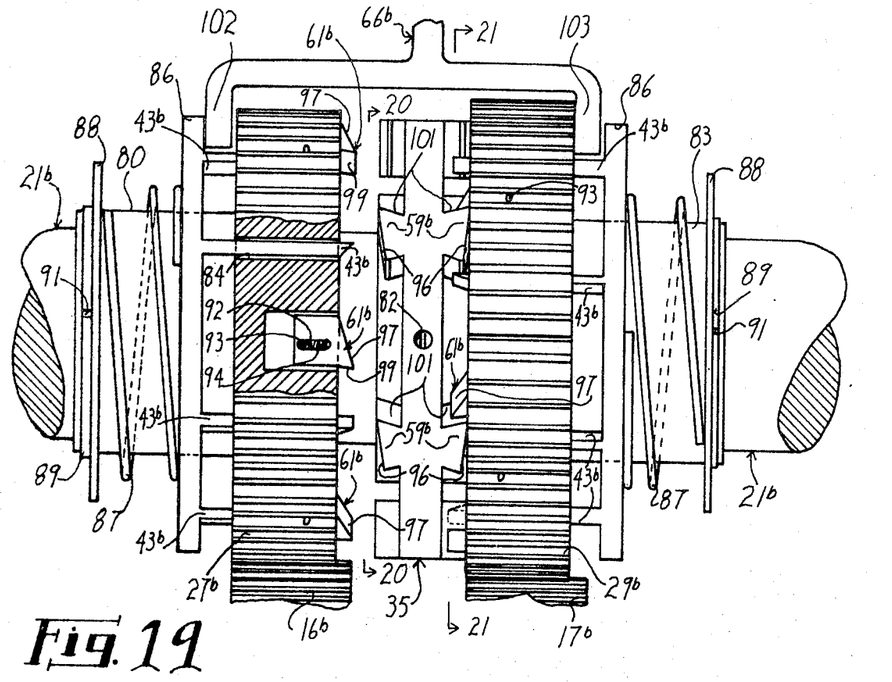
FIG. 19 is a side elevational view showing a modification wherein the connector elements carried by the rotary drive members move axially relative to the selector elements carried by the driven member.
Figure 20:
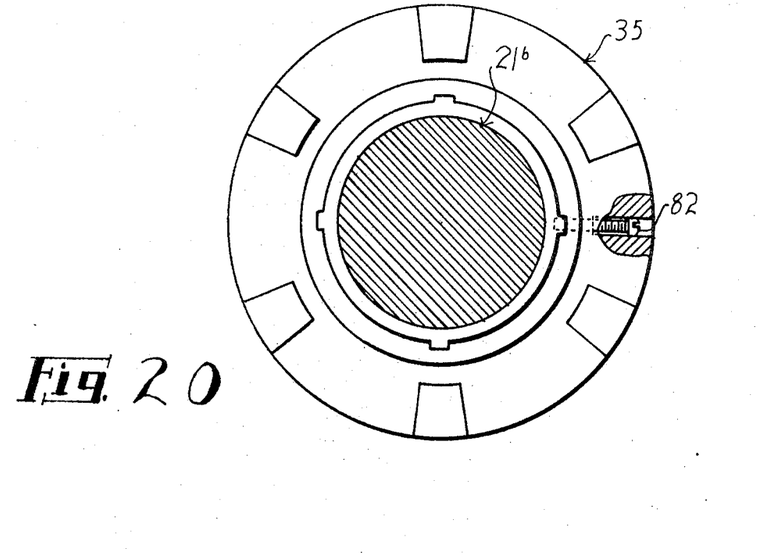
FIG. 20 is a sectional view taken along the line 20—20 of FIG. 19.

In FIGS. 19 through 22 of the drawings I show a further modified form of my invention in which connector elements 61b are carried by rotary drive members, such as gears 27b and 29b which move axially relative to adjacent connector elements 59b carried by opposite sides of a common selector element 35. The gears 27b and 29b are in mesh with gears 16b and 17b mounted on an idler shaft and in turn are operatively connected to a drive shaft, such as drive shaft 10 described hereinabove. The gear 29b is a first speed gear and the gear 27b is a second speed gear. Each of these gears transmits power through gear selector 35 to the driven shaft 21b in a manner similar to the transfer of power from the gears 27 and 29 through the gear selector elements 36 and 37 to the shaft 21. However, the gear selector element 35 is a common member which replaces the gear selector elements 36 and 37. Also, the gear selector element 35 is keyed to the shaft 21b and is secured rigidly thereto by a set screw 82, as shown in FIG. 20.

Figure 21:
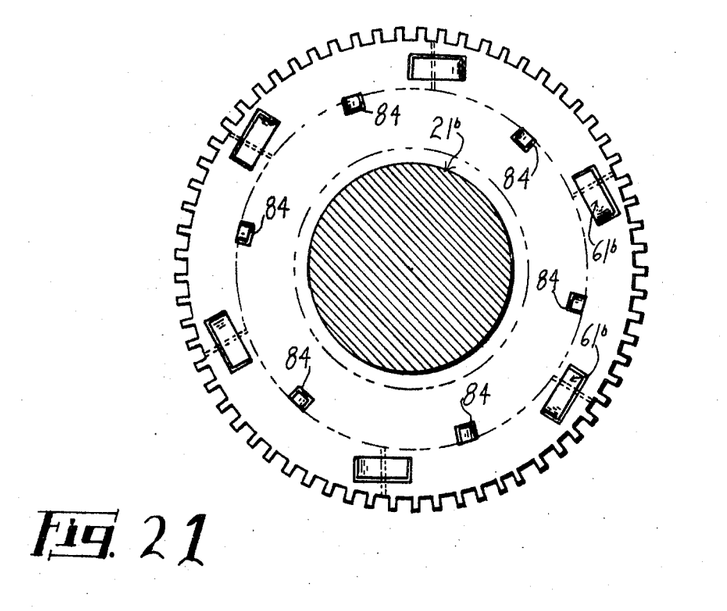
FIG. 21 is a sectional view taken generally along the line 21—21 of FIG. 19.
Figure 22:
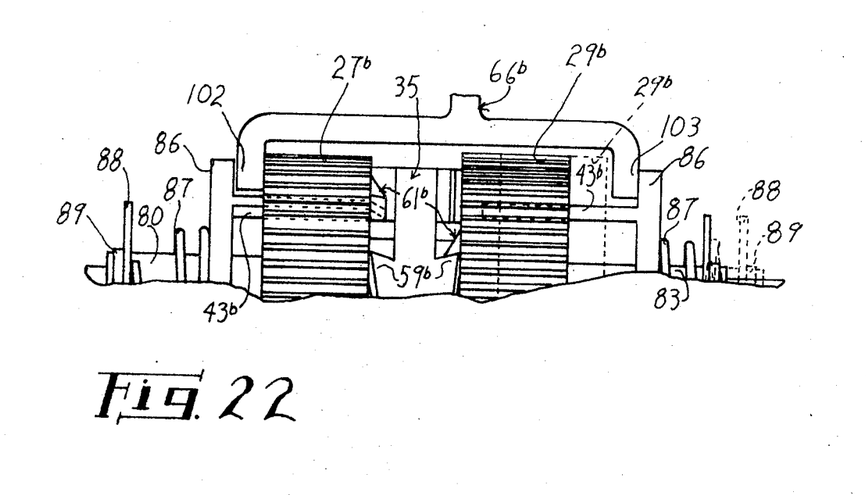
FIG. 22 is a fragmental view of the apparatus shown in FIG. 19 showing the position of the apparatus immediately after the shift fork has been shifted from a high gear to a lower gear.

The gear 27b is provided with an axially extending hub portion 80 which is adapted to rotate freely on the shaft 21b. In like manner, the gear 29b is provided with an axially extending hub portion 83 which rotates freely on the shaft 21b. As shown in FIGS. 19 and 21, angularly spaced passageways 84 are provided through each of the gears 27b and 29b for slidably receiving elongated members 43b which serve as stop members to limit relative rearward movement of the connector element 59b adjacent thereto. The elongated stop members 43b are carried by annular members 86 which are mounted in axially spaced relation to the outer sides of the gears 27b and 29b, as shown in FIGS. 19 and 22. The annular members 86 engage the outer surface of the hub 80 and 83 with a sliding fit whereby they are each adapted for axial movement relative to the hubs 80 and 83.

As shown in FIG. 19, a compression spring 87 surrounds the hubs 80 and 83 outwardly of the annular members 86. A stop washer 88 surrounds each of the hubs 80 and 83 adjacent the outer ends of the springs 87 to thus serve as a spring abutment. A retaining lock ring 89 engages an annular groove 91 provided in the outer surface of the hubs 80 and 83 to limit outward movement of the washers 88. Accordingly, the compression springs 87 urge the annular members 86 and their associated gears 27b and 29b toward each other.

Each connector element 61b is urged toward the common selector element 35 by a compression spring 92 which abuts a transverse pin 93 that rides in an elongated slot 94 and permits the connector element 61b to be depressed upon engagement thereof with the adjacent connector element 59b while the connector element 59b is rotating at a speed greater than the speed of rotation of the adjacent connector element 61b. As shown in FIG. 19, the outer portion of each of the connector elements 59b and 61b is provided with a cam surface 96 and 97, respectively, which slope forwardly and away from the adjacent gear, as viewed in the direction of rotation of the gear. Also, the leading edge of the connector elements 61b is provided with a leading surface 99 which is adapted to engage and interlock with a surface 101 carried by the adjacent connector element 59b. Accordingly, the surfaces 99 and 101 interlock each other in a manner similar to the interlock relationship between the surfaces 62 and 63 described hereinabove.

As shown in FIGS. 19 and 22, the gears 27b and 29b and their annular members 86 are shifted axially of the shaft 21b by a shift fork 66b having depending legs 102 and 103 disposed to enter the space between the outer surface of each gear and its associated annular member 86, as shown.

From the foregoing description, the operation of the apparatus shown in FIGS. 19 through 22 will be readily understood. FIG. 19 shows the first gear 29b shifted toward the left whereby the connector elements 61b carried thereby engage the adjacent connector elements 59b. Accordingly, the surfaces 99 and 101 interlock with each other as power is transmitted from the gear 17b to first gear 29b and then through the common selector element 35 to the shaft 21b.

To shift the apparatus to the second gear setting, the shift fork 66b is shifted toward the right, as viewed in FIG. 22, whereby the connector elements 61b carried by the gear 27b engage the adjacent connector elements 59b carried by the selector element 35. Due to the interlock between the connector elements 61b carried by the gear 29b and the adjacent connector elements 59b carried by the gear selector element 35, the gear 29b remains in the solid line position shown in FIG. 22 with the surfaces 101 and 99 interlocked until the connector elements 59b carried by the common selector element 35 move to a position in advance of the position of the adjacent connector elements 61b carried by the gear 29b. At this time, the compression spring 87 urges the hub 83 of gear 29b toward the right, as viewed in FIG. 22 whereby the first gear 29b is moved to the dotted line position shown in FIG. 22. It will be noted that the stop members 43b move with the annular member 86 as the shift fork 66b is shifted, whereby they are removed from engagement with the adjacent connector elements 61b. It will thus be seen that the operation of the apparatus shown in FIGS. 19 through 22 is very similar to the operation of the apparatus described in FIGS. 1 through 18. Instead of moving the selector elements located between the gears axially toward and away from the gears, as disclosed in FIGS. 1 through 18, the selector elements are carried by opposite sides of a common member 35 fixed to the shaft 21 and axial movement is imparted to the gears and the connector elements 61b carried thereby. Since the operation of the apparatus shown in FIGS. 19 through 22 is so similar to the operation of the apparatus disclosed in FIGS. 1 through 18 described hereinabove, no further description is deemed necessary.

From the foregoing, it will be seen that I have devised an improved selector mechanism for a transmission. By providing mechanism for shifting the power transmitting rotary members, such as gears, of the transmission to selected positions without having to reduce the speed of rotation of the gears during the shift operation together with improved means for down shifting to a lower gear setting, I not only provide a smoother change of gears but also provide a substantially positive drive throughout each gear changing operation. Furthermore, by providing gear selector mechanism which operates in a positive manner for both up shifting to a higher gear and down shifting to a lower gear by merely shifting the actuator member from one gear setting to another, the apparatus may be operated in an efficient manner by unskilled labor and at the same time I bring about a material saving in power consumption and the time actually required to shift the gears.

While I have shown my invention in several forms, it will be obvious to those skilled in the art that it is not so limited, but is susceptible of various other changes and modifications, without departing from the spirit thereof.

What I claim is:

1. In a selector for a transmission having a rotatable shaft-like member and at least one pair of power transmitting rotary members mounted for rotation about an axis which is common with the axis of rotation of said shaft-like member with means operatively connecting said rotary members in driving relation with each other:
   a. a selector element for each said rotary member mounted non-rotatably on said shaft-like member adjacent a side of each said rotary member,
   b. at least one connector element rotatable with each rotary member of said pair of rotary members at the side thereof adjacent said selector element with each said selector element and the connector rotatable with the adjacent rotary member being adapted for relative axial movement,
   c. means to urge said selector element and the connector element rotatable with the adjacent rotary member axially away from each other,
   d. at least one cooperating connector element carried by each said selector element disposed to engage and rotate with said connector element which is rotatable with the rotary member adjacent thereto upon relative axial movement of said selector element and the adjacent connector element rotatable with the rotary member toward each other and disposed to disengage said connector element which is rotatable with the rotary member adjacent thereto upon relative axial movement of said selector element and the adjacent connector element rotatable with the rotary member away from each other,
   e. actuator means disposed to impart relative axial movement between each said selector element and the connector element rotatable with the rotary member adjacent thereto so that adjacent connector elements are movable into engagement with and rotate with each other until said actuator means is shifted and said cooperating connector element carried by said selector element moves to a position in advance of said connector element rotatable with said rotary member, and
   f. depressable means urging at least one of said adjacent connector elements toward the other of said adjacent connector elements so that said one connector element is depressed upon engagement with said other of said adjacent connector elements while the connector element of said adjacent connector elements which is carried by said selector element is rotating at a speed greater than the speed of rotation of the connector element of said adjacent connector elements which is rotatable with said rotary member.

2. A selector for a transmission as defined in claim 1 in which said depressable means comprises a spring member interposed between said one connector element and support means therefor.

3. A selector for a transmission as defined in claim 1 in which a plurality of said one connector elements are carried by a common member and said depressable means comprises a spring member interposed between said common member and support means therefor.

4. A selector for a transmission as defined in claim 1 in which said connector element rotatable with said rotary member and said connector element carried by said selector element have cooperating cam surfaces which slope forward and away from the rotary member adjacent thereto as viewed in the direction of rotation of said rotary member adjaceent thereto and interlock with each other upon movement of said connector elements into engagement with each other.

5. A selector for a transmission as defined in claim 1 in which at least one movable stop member is mounted for rotation with one of said connector elements in position to engage and limit rearward rotary movement of an adjacent cooperating connector element and means is provided for moving said stop member out of the path of movement of said adjacent connector element prior to disengagement of said connector elements with each other.

6. A selector for a transmission as defined in claim 5 in which said stop member is provided with a sloping cam surface disposed to be engaged by said adjacent connector element upon forward rotary movement of said adjacent connector element relative to said cam surface to move said stop member out of the path of forward movement of said adjacent connector element.

7. A selector for a transmission as defined in claim 1 in which each said selector element is adapted for axial movement relative to the adjacent rotary member.

8. A selector for a transmission as defined in claim 1 in which the rotary members of said pair of rotary members are spaced axially from each other with a pair of said selector elements therebetween and said means urging said selector element and the connector element rotatable with the adjacent rotary member axially away from each other comprises resilient means urging said selector elements toward each other.

9. A selector for a transmission as defined in claim 1 in which each selector element is fixed to said shaft-like member with said rotary members and the connector elements rotatable therewith being adapted for axial movement toward and away from adjacent selector elements.

10. A selector for a transmission as defined in claim 9 in which said actuator means disposed to impart relative axial movement between each selector element and the connector element rotatable with the rotary member adjacent thereto comprises:

a. an annular member carried by and spaced from each said rotary member at the side thereof opposite the side carrying said connector element,
b. a shift element extending between each rotary member and the annular member carried thereby, and
c. means operatively connecting said shift elements to each other so that they move concomitantly.

11. A selector for a transmission as defined in claim 10 in which each said annular member is adapted for axial movement to a first position toward its rotary member and to a second position away from its rotary member and at least one stop member is operatively connected to each said annular member in position to engage and limit rearward rotary movement of a connector element carried by an adjacent selector element upon movement of said annular member to said first position and to move out of the path of movement of said connector element carried by the adjacent selector element upon movement of said annular member to said second position.

12. A selector for a transmission as defined in claim 11 in which resilient means urges each said annular member toward said first position so that each said annular member moves with its rotary member upon movement of its rotary member toward the adjacent selector member and moves away from its rotary member and the adjacent selector member upon movement of said shift member away from its rotary member.

13. A selector for a transmission as defined in claim 1 in which two pairs of said power transmitting rotary members are mounted for rotation about an axis which is common with the axis of rotation of said shaft-like member with selector elements between each pair of rotary members and lock out means restrains relative axial movement between the selector elements and the connector elements rotatable with the rotary members of one said pair of rotary members while relative axial movement is taking place between the selector elements and the connector elements rotatable with the rotary members of the other pair of rotary members.

14. A selector for a transmission as defined in claim 13 in which said lock out means comprises:

a. an elongated member mounted for pivotal movement intermediate its ends between said two pairs of rotary members, and
b. a retaining member adjacent each end of said elongated member with one retaining member being in position to be moved outwardly in response to axial movement between the selector elements and the connector elements rotatable with the rotary members of said one pair of rotary members thus moving the other of said retaining members inwardly to restrain relative axial movement between the selector elements and the connector elements rotatable with the rotary members of said other pair of rotary members.

* * * * *